G. H. BOLDUC.
STREET CAR FENDER.
APPLICATION FILED MAY 2, 1907.
912,530.
Patented Feb. 16, 1909.
2 SHEETS—SHEET 1.
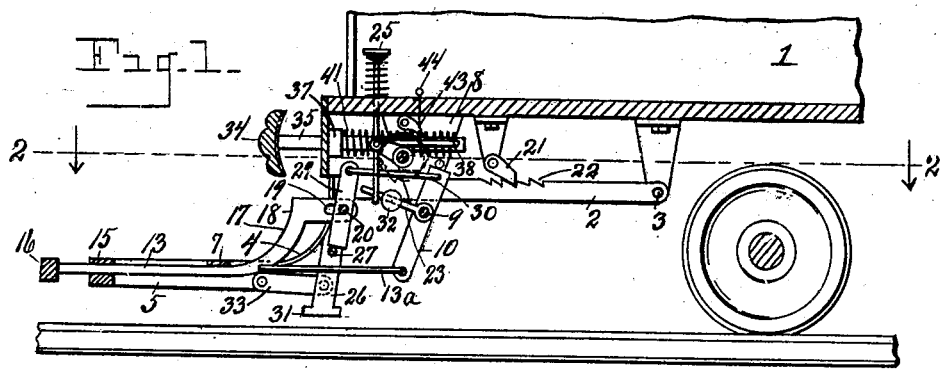
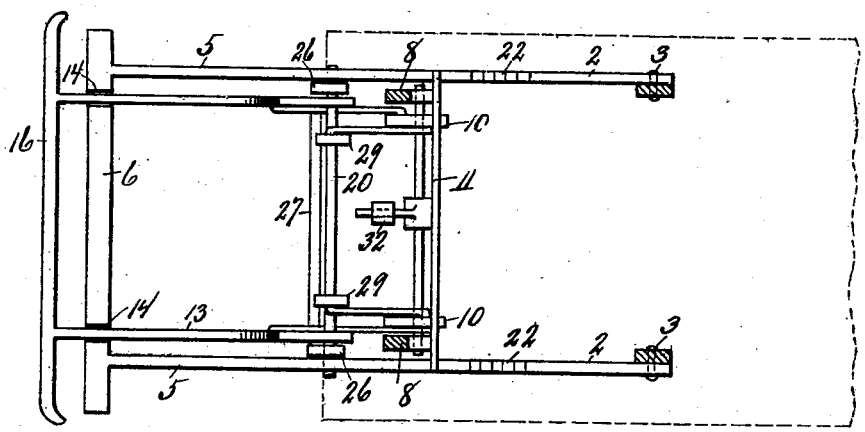
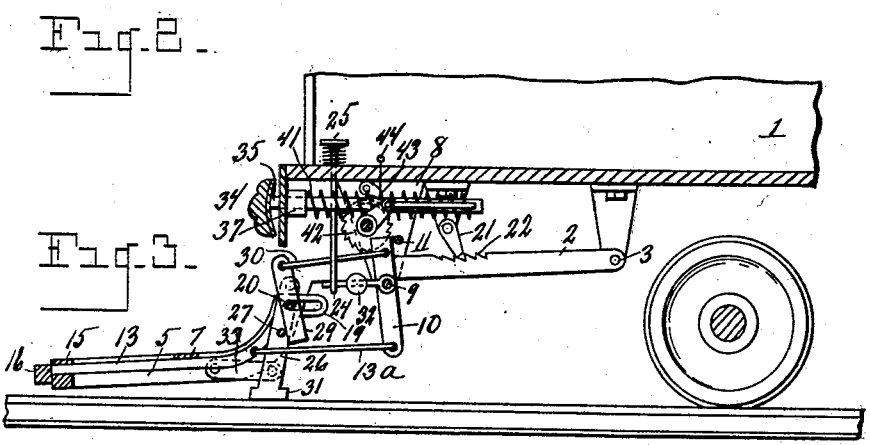
Witnesses
Inventor
George H. Bolduc
Attorneys

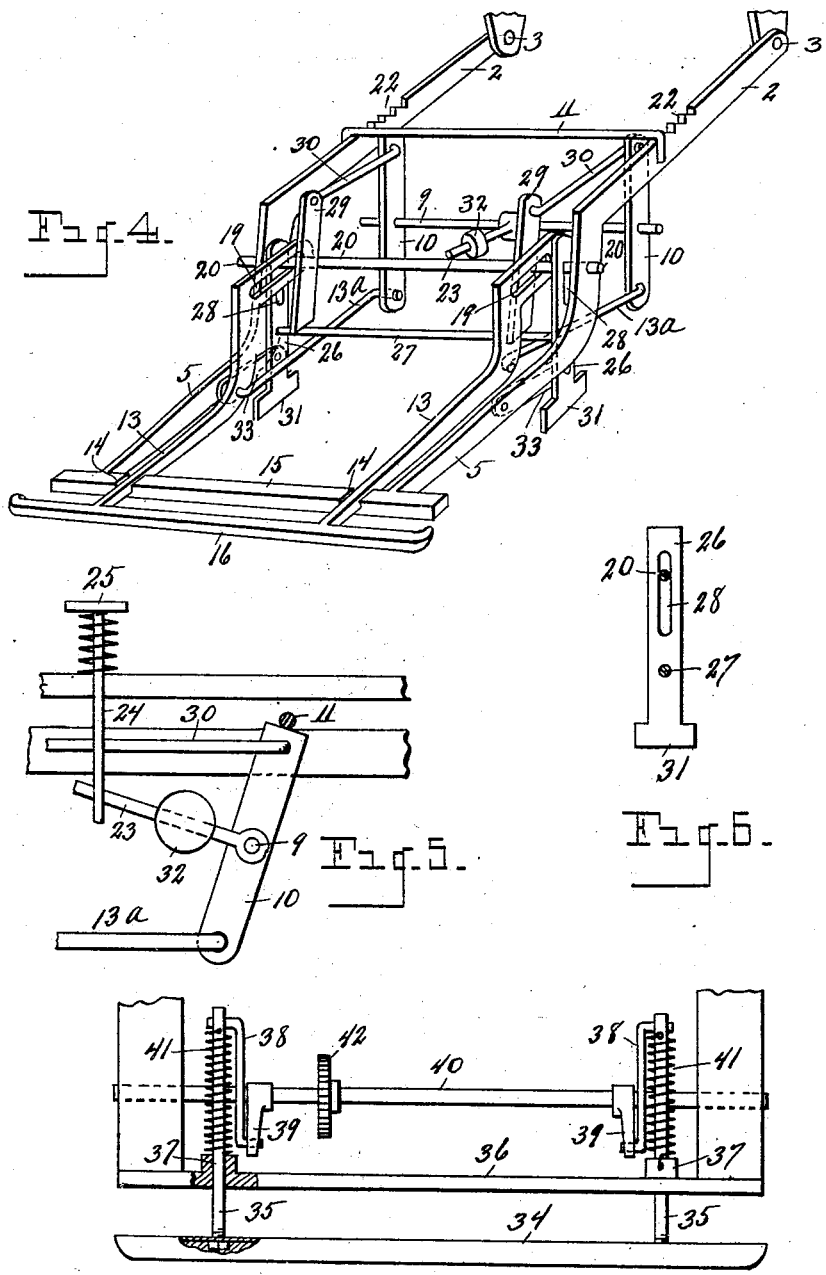

UNITED STATES PATENT OFFICE.

GEORGE H. BOLDUC, OF DETROIT, MICHIGAN.

STREET-CAR FENDER.

No. 912,530.　　　Specification of Letters Patent.　　　Patented Feb. 16, 1909.

Application filed May 2, 1907. Serial No. 371,405.

*To all whom it may concern:*

Be it known that I, GEORGE H. BOLDUC, a citizen of the Dominion of Canada, residing at Detroit, in the county of Wayne, State of Michigan, have invented certain new and useful Improvements in Street-Car Fenders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to safety street car fenders, and consists in the construction and arrangement of parts hereinafter fully set forth and pointed out particularly in the claims.

The object of the invention is to provide simple and efficient means whereby the fender may be dropped upon the track by the motorman, in case a person or some obstacle is encountered, the arrangement being such as to render the dropping of the fender automatic, in case the motorman should fail to actuate it manually. The above object is attained by the structure illustrated in the accompanying drawing, in which:—

Figure 1 is a longitudinal section through a car fender embodying my invention, showing the parts in their normal position. Fig. 2 is a horizontal section on line 2—2 of Fig. 1. Fig. 3 is a sectional view similar to Fig. 1, showing the parts in the position when the fender is dropped. Fig. 4 is a perspective view of the fender with the fender slats removed. Fig. 5 is a fragmentary view in elevation, showing one of the pivoted arms which support the fender in its raised position, and the means for actuating said arms manually to drop the fender. Fig. 6 is a fragmentary view showing one of the slotted supporting legs which are employed to prevent contact of the tripping bar at the forward end of the fender with the track or a projection therein by a tilting of the car. Fig. 7 is a fragmentary view of the forward end of the car frame, showing a yielding buffer mounted on the forward end thereof above the vertical portion of the fender frame, and adapted to prevent injury by the forward end of the car, to a person falling on the fender.

Referring to the characters of reference 1, designates one of the side sills of a car frame to which the ends of the side bars 2 of the fender frame are pivoted, as shown at 3. The forward ends of the side bars curve downwardly and outwardly, as shown at 4, and extend horizontally in front of the car frame, as shown at 5. Connecting the forward ends of said outer portions is a cross bar 6 which forms the front of the fender proper. Mounted upon the forward ends 5 of the bars of the frame and upon the cross bar 6, is a slatted fender 7. Crossing transversely below the car frame or sills and journaled in hangers 8 depending therefrom is a rock shaft 9 upon which are fixed the arms 10. Crossing between the side bars 2 of the fender frame and attached at its ends thereto is a horizontal rod 11 under which the upper ends of the pivoted arms 10 engage to hold the side bars of the fender in a raised position, as shown in Fig. 1. Pivoted at one end to the lower end of the arms 10 are the connecting rods 13$^a$, the other end of said rods being pivoted to the slide bars 13 which lie in recesses 14 in the cross bar 6 of the fender frame and are confined therein by the upper plate 15 of the fender. Mounted upon the forward ends of the slide bars 13 is a tripping bar 16 which stands in front of the cross bar 6 of the fender frame and projects transversely beyond the sides thereof. The rear ends of the slide bars 13 curve upwardly, as at 17, and extend horizontally rearward, as at 18, said horizontal portions being slotted, as at 19, to freely receive the transverse rod 20 which crosses between the side bars 2 of the fender frame and is supported at its ends in the downwardly extending portions 4 thereof, whereby the rear ends of the slide bars 13 are supported in a manner to permit said bars to reciprocate longitudinally.

It will be noted that when the fender is raised, as shown in Fig. 1, and the slide bars 13 are drawn outwardly, the arms 10, through the connecting rods 13$^a$, will be actuated to cause their upper ends to swing under the transverse rod 11, and support the fender frame in said raised position the proper distance above the track. Should the fender while the car is moving forward, strike an object upon the track, the tripping bar 16 will first encounter said object, causing the bars 13 to slide longitudinally and actuating the arms 10 to swing their upper ends from under the rod 11, thereby relieving the fender frame from support and causing it to drop to the track, as shown in Fig. 3, in which position any object on the track is prevented passing under it, and in which position it may be securely locked against being raised or against rebounding by means of the gravity pawls or dogs 21 which are pivoted to the sills of the car frame and engage in notches 22 in the upper edges of the side bars 2. By releasing the dogs 21 and raising the fender frame, and at the same time drawing outwardly upon the tripping bar, the parts may be restored to their normal position, as shown in Fig. 1.

To provide for dropping the fender by manual operation, an arm 23 is mounted on the rock shaft 9 and the forward end thereof engages freely in an aperture in the lower end of a vertically movable rod 24 passing through the floor of the vestibule and having upon its upper end a tread-plate 25. By pressing downwardly upon said plate when the parts are in the position shown in Fig. 1, shaft 9 will be rocked and the arms 10 actuated to carry them from under the rod 11 thereby permitting the fender frame to drop. By this arrangement the motorman may drop the fender, if it appears to be necessary, without waiting for the automatic operation thereof through contact with an object on the track.

To prevent the fender being accidentally dropped through contact of the tripping bar with the track or some object thereon through the tilting movement of the car when the fender is attached to a car having a single truck, there are provided the slotted supporting legs 26 which are connected by a cross bar 27 and through the slot 28 in the upper ends of which passes the transverse rod 20. Pivoted upon said transverse rod are the arms 29 whose lower ends, when the fender is raised, stand above and in contact with the cross bar 27 connecting said legs, and whose upper ends are connected by the links 30 with the upper ends of the arms 10. When the parts are in the position shown in Fig. 1, a tilting of the car sufficiently to bring the forward end of the fender into contact with the track under ordinary conditions, will instead cause the feet 31 of the legs 26 to strike the track and hold the fender from contact therewith, because of the fact that said legs normally depend below the plane of the fender frame. Upon the tripping of the fender the legs are prevented from holding the frame from the track by reason of the fact that the arms 29 are carried from engagement with the cross bar 27 through the medium of the connecting links 30, thereby leaving the legs free to move vertically upon the rod 20 because of the slots 28 therein. Upon raising the fender frame and drawing outwardly upon the slide bars 13, the parts will be actuated to support the fender frame in the raised position as before described, and at the same time the arms 29 will be swung over the cross bar 27 to again hold the depending legs in a position to engage the track and prevent the forward end of the fender coming in contact therewith. The lower ends of the legs 26 are connected with the fender frame by means of the pivoted links 33 whereby said legs are supported and maintained properly in place.

Mounted upon the arms 23 is an adjustable weight 32 which tends to overcome the resistance offered to the sliding of the bars 13, and minimizes the blow necessary to trip the fender.

As will be seen on referring to Fig. 7 the buffer consists of a padded cross bar 34 to which are connected the outer ends of the plunger bolts 35 that pass through the cross piece 36 at the front of the car frame and are adapted to slide in the bearings 37 mounted upon said frame. Pivotally connected to the rear ends of the plunger bolts are the links 38 whose forward ends are pivoted to the arms 39 mounted upon the shaft 40 journaled in the frame of the car. Embracing the plunger bolts and confined between the bearings 37 and the inner ends of said bolts are the coiled springs 41, the inner ends of said springs being attached to said bolts whereby when pressure is applied to the buffer, the plunger bolts slide inwardly through said bearings and expand said springs whose tension is exerted to return said plunger bolts to their normal position. As the plunger bolts move inwardly, the shaft 40 is rotated through the links and crank arms, and the ratchet wheel 42 thereon is rotated. Engaging said ratchet wheel is a pawl or detent 43 which prevents a backward rotation thereof and holds the buffer from being extended through the contraction of the springs 41 until said detent is released or disengaged from the ratchet. The detent may be disengaged from the ratchet by drawing upwardly upon the rod 44 connected therewith when the springs 41 will return the parts to their normal position so that the buffer will be projected beyond the frame of the car above the vertical portion of the fender in position for a succeeding operation.

Having thus fully set forth my invention, what I claim as new and desire to secure by Letters Patent, is:—

1. A car fender comprising a vertically movable frame pivoted at its rear end to the car frame in the rear of the front of the car, a slidable forward section mounted upon said movable frame, a rock shaft suspended from the frame of the car, trip arms mounted on said shaft for holding the fender frame in a raised position, means connecting the trip arms to the movable forward portion whereby a movement of said forward portion will trip said arms and allow the fender frame to fall.

2. A fender comprising side bars, pivoted at their rear ends, a cross bar connecting the side bars forward of their points of pivot, forwardly extending bars mounted to slide upon said side bars, a rock shaft supported from the car frame, trip arms for holding said fender in a raised position, mounted on said rock shaft and engaging said cross bar, means connecting said trip arms with the movable portion of the fender frame for disengaging them from said cross bar, and locking dogs for preventing a rebounding of the frame after the fender has been dropped.

3. A car fender comprising the longitudinally extending pivoted bars forward of their points of pivot, a cross bar connecting said bars, a forward portion of the fender frame mounted to slide upon said bars, trip arms pivoted below said cross bar and adapted to engage said bar to hold the fender frame in a raised position, connecting rods coupled to the lower ends of said arms and to the movable portion of the frame, and means for actuating said movable portion.

4. A car fender comprising the pivoted side bars, means for maintaining the forward end of said bars in a raised position, means for unlocking the forward ends of the bars to permit them to fall to the track, supporting legs adapted to engage the track and prevent the forward end of the fender striking through the tilting of the car frame, and means for releasing the supporting legs to permit the fender to fall.

5. A fender comprising the side bars pivoted in the rear of the front of the car frame and extending downwardly and forwardly to form the fender frame, a cross bar connecting said side bars forward of their points of pivot, slidable bars mounted to slide upon said bars of the frame and carrying the forwardly extending tripping bar, mechanism connected with said slidable bars and engaging said cross bar for holding the fender frame in a raised position, said mechanism being actuated through a movement of said slidable bars to permit the fender frame to fall and also actuated by a movement of the slidable bars when the fender frame is raised to lock the fender frame in said raised position.

6. The combination with a car frame, of a fender, a buffer mounted on the end of said frame supported above the fender, said buffer being movable horizontally, means for moving the buffer outwardly to its normal position, and means for locking said buffer when moved inwardly.

In testimony whereof, I sign this specification in the presence of two witnesses.

GEORGE H. BOLDUC.

Witnesses:
  O. B. BAENZIGER,
  L. G. HOWLETT.